(12) United States Patent
Matsuzawa et al.

(10) Patent No.: US 11,057,535 B2
(45) Date of Patent: Jul. 6, 2021

(54) LIGHT GUIDE AND IMAGE SCANNING DEVICE

(71) Applicant: Mitsubishi Electric Corporation, Chiyoda-ku (JP)

(72) Inventors: Taku Matsuzawa, Chiyoda-ku (JP); Toru Shiraki, Chiyoda-ku (JP); Daisuke Ohama, Chiyoda-ku (JP); Yuki Okuhigashi, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 16/771,911

(22) PCT Filed: Apr. 16, 2019

(86) PCT No.: PCT/JP2019/016245
§ 371 (c)(1),
(2) Date: Jun. 11, 2020

(87) PCT Pub. No.: WO2019/244459
PCT Pub. Date: Dec. 26, 2019

(65) Prior Publication Data
US 2020/0396353 A1 Dec. 17, 2020

(30) Foreign Application Priority Data
Jun. 21, 2018 (JP) .............................. JP2018-117551

(51) Int. Cl.
*H04N 1/04* (2006.01)
*H04N 1/028* (2006.01)
*F21V 8/00* (2006.01)

(52) U.S. Cl.
CPC ......... *H04N 1/02835* (2013.01); *G02B 6/001* (2013.01); *G02B 6/0006* (2013.01); *H04N 1/02825* (2013.01)

(58) Field of Classification Search
CPC ........... H04N 1/02835; H04N 1/02825; G02B 6/0006; G02B 6/001
See application file for complete search history.

(56) References Cited

U.S. PATENT DOCUMENTS 6,259,082 B1  7/2001  Fujimoto et al.
2006/0098247 A1  5/2006  Sawada
(Continued)

FOREIGN PATENT DOCUMENTS

JP  11-55464 A  2/1999
JP  11-215302 A  8/1999
(Continued)

OTHER PUBLICATIONS

International Search Report dated Jun. 18, 2019 in PCT/JP2019/016245 filed Apr. 16, 2019, 1 page.

*Primary Examiner* — Cheukfan Lee
(74) *Attorney, Agent, or Firm* — Oblon, McClelland, Maier & Neustadt, L.L.P.

(57) ABSTRACT

A light guide includes an incident surface provided at an end portion of the light guide in the longitudinal direction and upon which light emitted by a light source incidents; an emission surface being flat-shaped, the emission surface emitting the light that enters the light guide through the incident surface to an illumination target; a reflective surface having a parabolic shape to generate collimated light directed toward the emission surface by reflecting light from a focal point of the parabolic shape or light from a predetermined area including the focal point, and a light scatterer having a predetermined scattering area to scatter light that entered the light guide through the incident surface and reflect light that entered the light guide through the incident surface in a direction of the reflective surface. The emission surface includes a first emission surface that has a predetermined length from an end portion of the light guide facing (Continued)

the light source along the longitudinal direction, the emission surface being set to an angle at which, among the light scattered by the light scatterer, the collimated light generated by the reflective surface is totally reflected.

13 Claims, 13 Drawing Sheets

(56) References Cited

U.S. PATENT DOCUMENTS

2016/0212294 A1* 7/2016 Ohzawa ............... G02B 6/0001
2016/0277623 A1* 9/2016 Ouchi ................. H04N 1/02835
2020/0344377 A1* 10/2020 Matsuzawa et al. ........................
                                                     H04N 1/1295

FOREIGN PATENT DOCUMENTS

JP        2004-266313 A    9/2004
JP         2006-73383 A    3/2006

* cited by examiner

LIGHT GUIDE AND IMAGE SCANNING DEVICE

TECHNICAL FIELD

The present disclosure relates to a light guide used in an image scanning device such as a facsimile, a copy machine, or a scanner, and to an image scanning device.

BACKGROUND ART

Patent Literature 1 discloses an image scanning device mounted with an illumination device using a light guide that is parabolic in shape.

CITATION LIST

Patent Literature

Patent Literature 1: Unexamined Japanese Patent Application Publication No 2004-266313

SUMMARY OF INVENTION

Technical Problem

Patent Literature 1 discloses a light guide provided with, to reflect light from a light source and to propagate the light in the light guide, a parabolic surface on an end of the light guide. The light emitted from the end of the light guide end has poor optical characteristics for irradiating a scanning target with light stably across an entire scanning area. Thus, the light guide is made to be long in the X-axis direction in order to irradiate the scanning target with light stably, and this is problematic in that the size of the image scanning device gets increased.

In order to solve such a problem, an object of the present disclosure is to provide a short light guide and a compact image scanning device having stable optical characteristics.

Solution to Problem

The light guide according to the present disclosure is rod-shaped and extends in a longitudinal direction to guide light entering the light guide to an illumination target. The light guide includes an incident surface, an emission surface, a reflective surface, and a light scatterer. The incident surface is provided at the end portion in the longitudinal direction upon which light emitted by the light source incidents. The emission surface is flat-shaped, the emission surface emitting the light that enters the light guide through the incident surface to the illumination target. The reflective surface has a parabolic shape to generate collimated light directed toward the emission surface by reflecting light from a focal point of the parabolic shape or light from a predetermined area including the focal point. The light scatter has a predetermined scattering area to scatter light that entered the light guide through the incident surface and reflect light that entered the light guide through the incident surface in a direction of the reflective surface. The emission surface includes a first emission surface that has a predetermined length from the end portion of the light guide facing the light source along the longitudinal direction, the emission surface being set to an angle at which, among the light scattered by the light scatterer, the collimated light generated by the reflective surface is totally reflected.

Advantageous Effects of Invention

According to the present disclosure, extending the light guide is unnecessary because reflection light with poor optical characteristics can be blocked by such inclusion of the first emission surface that has a predetermined length from an end portion of the light guide facing the light source along the longitudinal direction and totally reflects, among the light scattered by the light scatterer, the light reflected off the reflective surface that became the collimated light, and thus a short light guide and a compact image scanning device that have stable optical characteristics can be attained.

DESCRIPTION OF EMBODIMENTS

Embodiment 1

Figure 1:
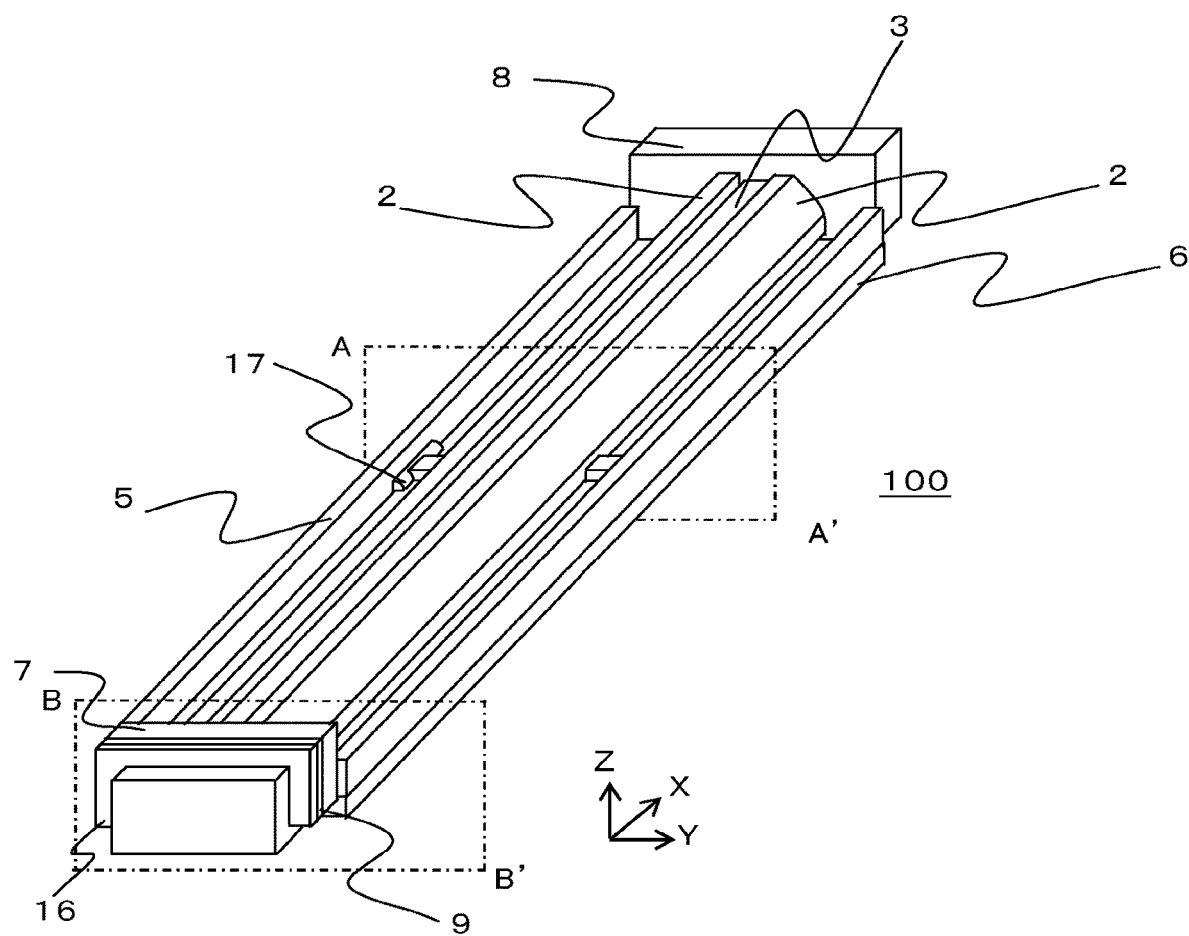
FIG. 1 is a perspective view of an image scanning device according to Embodiment 1 of the present disclosure.

An image scanning device 100 according to Embodiment 1 of the present disclosure is described below with reference to the drawings. The same or similar components are given the same reference signs throughout the drawings. In the drawings, X, Y, and Z indicate coordinate axes. The X-axis direction is defined as the main scanning direction (longitudinal direction), the Y-axis direction is defined as the sub-scanning direction (transverse direction), and the Z-axis direction is defined as the scanning depth direction. The origin of the X-axis is set to the middle of the length of the image scanning device 100 in the main scanning direction. The origin of the Y-axis is set to the middle of the length of the image scanning device 100 in the sub-scanning direction. The origin of the Z-axis is set to the position to which a document M is fed to be scanned by the image scanning device 100.

Figure 2:
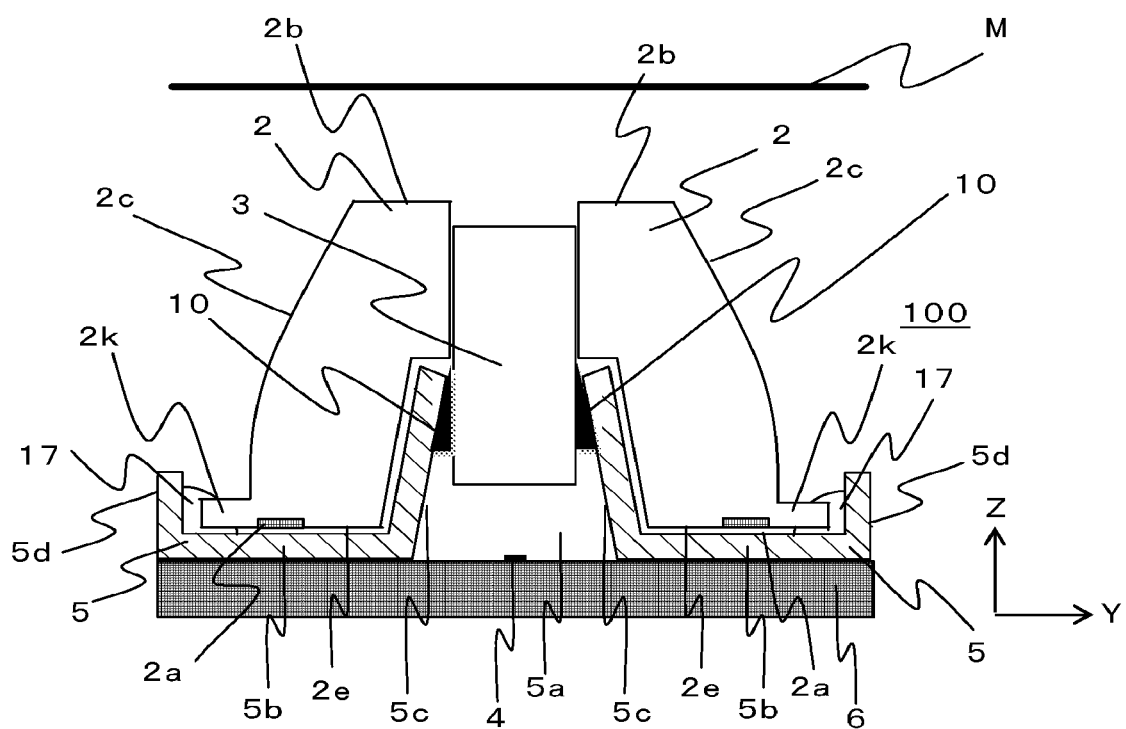
FIG. 2 is a cross-sectional view of the image scanning device according to Embodiment 1 of the present disclosure.
Figure 3:
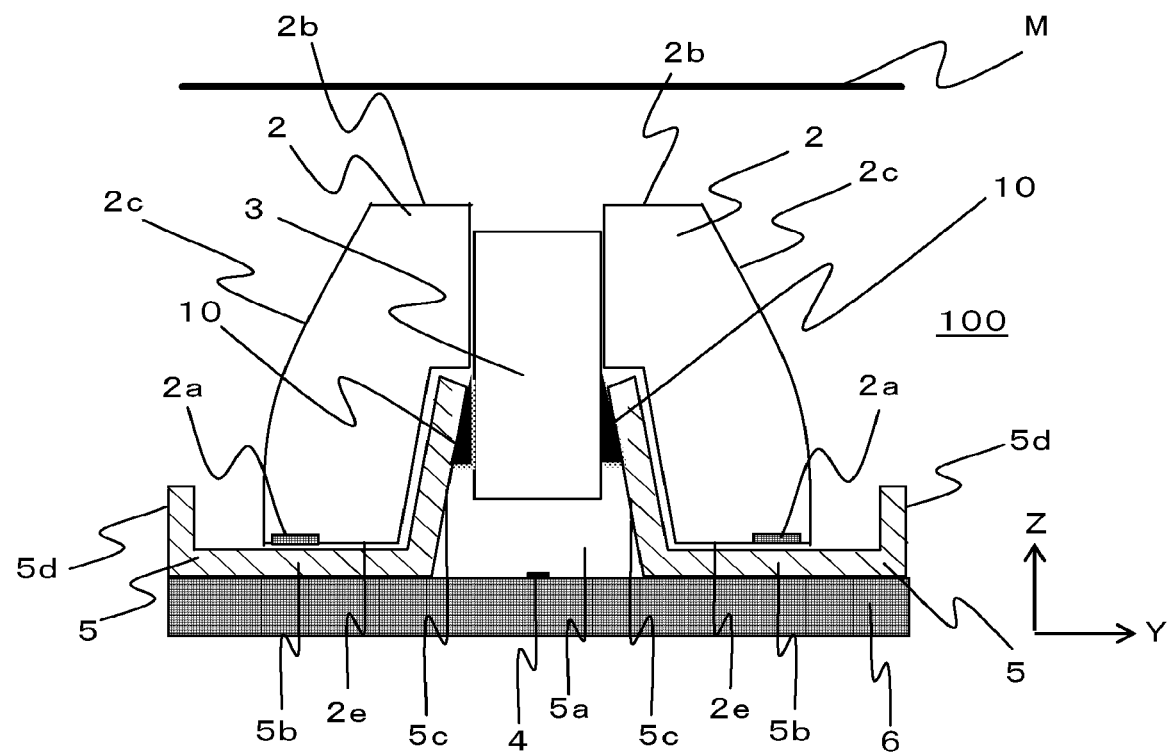
FIG. 3 is a cross-sectional view of an end portion of the image scanning device according to Embodiment 1 of the present disclosure.
Figure 4:
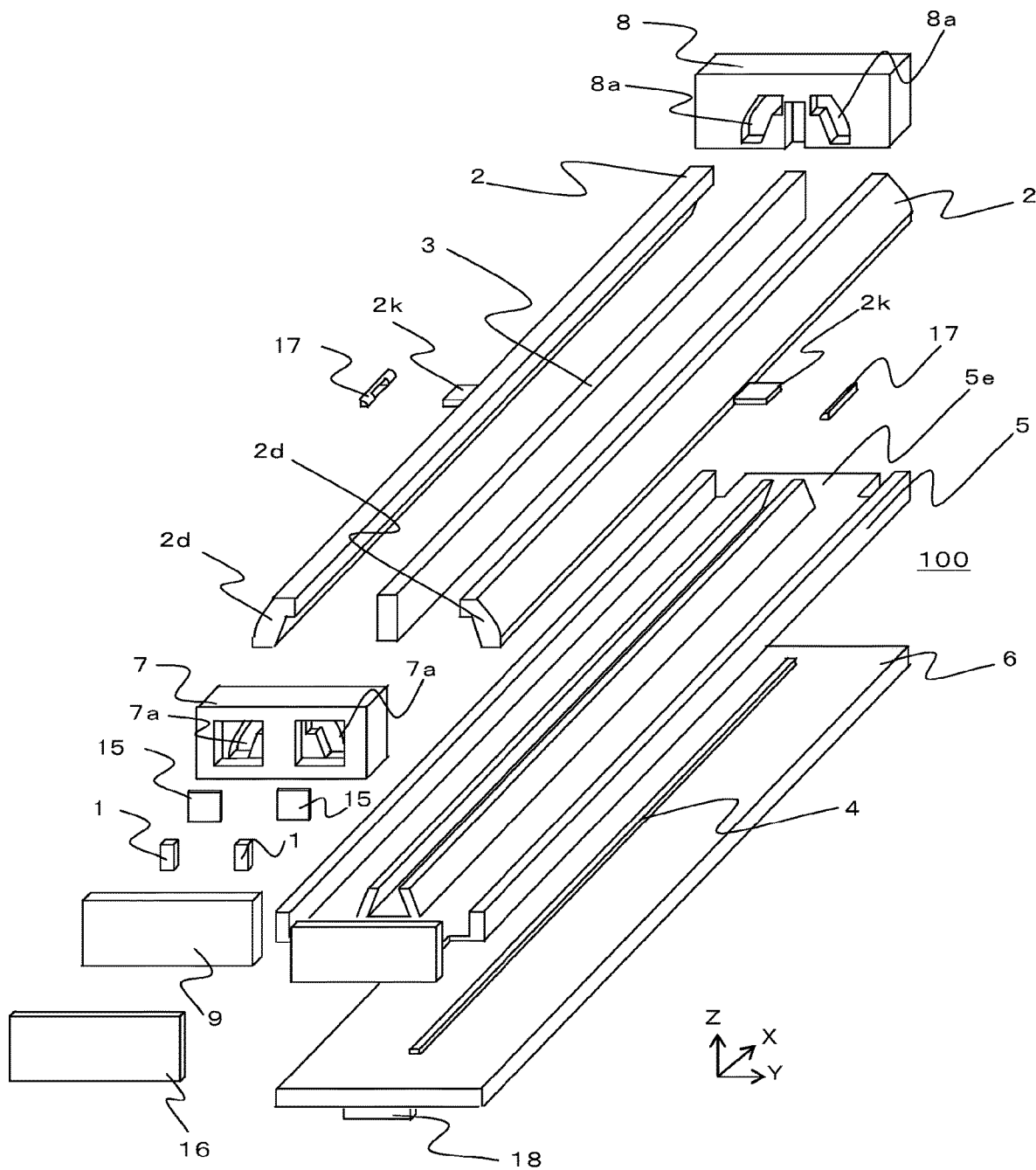
FIG. 4 is an exploded view of the image scanning device according to Embodiment 1 of the present disclosure.

FIG. 1 is a perspective view of the image scanning device 100 according to Embodiment 1 of the present disclosure. FIG. 2 is a cross-sectional view of the image scanning device 100 according to Embodiment 1 of the present disclosure taken along line A-A' of FIG. 1. FIG. 3 is a cross-sectional view of the image scanning device 100 according to Embodiment 1 taken along B-B' in FIG. 1. That is, FIG. 2 is a cross-sectional view of the image scanning device 100 on the YZ plane. FIG. 4 is an exploded view of the image scanning device 100 according to Embodiment 1 of the present disclosure. The image scanning device 100 according to Embodiment 1 of the present disclosure is described with reference to FIG. 1 to FIG. 4.

The document M is a medium to be scanned such as a banknote, a securities certificate, or another common document. The document M is an example of the illumination target. Image information of the document M is read by scanning by the image scanning device 100. A light source 1 is a light emitting device such as a light emitting diode (LED) device, an organic electroluminescent (EL) device, and so on. As the light source 1, a light source that emits red light (R), green light (G), blue light (B), white light (H), ultraviolet light (UV), infrared light (IR), and other light in accordance with the image information to be read by scanning is used.

A light guide 2 is a rod-shaped transparent body that is made of resin or glass for example. The light guide 2 extends in the X-axis direction. An incident surface 2d is provided on an end portion of the light guide 2 in the X-axis direction. The light source 1 is arranged to face the incident surface 2d. In a case where the light emitted from the light source 1 is light from a white light source, infrared light unnecessary for image scanning might be emitted. Therefore, an infrared cut filter 15 is set between the light source 1 and the incident surface 2d. Thus, light of wavelengths transmitted through the infrared cut filter 15 enters the light guide 2 through the incident surface 2d, and propagates through the light guide 2 in the X-axis direction while being guided by the light guide 2. The light guide 2 includes, at one end in the Z-axis direction, a flat surface 2e that extends in the X-axis direction. The flat surface 2e has a light scatterer 2a formed in the X-axis direction. The light scatterer 2a has a scattering area with a predetermined length in the Y-axis direction. The light guide 2 includes, at the other end in the Z-axis direction, an emission surface 2b that extends in the X-axis direction and emits light to outside of the light guide 2. The light guide 2 has, on one side surface of side surfaces thereof that connect the flat surface 2e and the emission surface 2b together, a reflective surface 2c that extends in the X-axis direction. The reflective surface 2c is parabolic thereby reflecting light from the light scatterer 2a toward the emission surface 2b.

The light source 1 and the light guide 2 as a pair are also referred to as an illumination device.

An optical imaging system 3 is, for example, rod lenses arranged in an array. The optical imaging system 3 is set between the document M and a board 6 and is held to a frame 5 by a retaining member 10 such as an adhesive or tape. The optical imaging system 3 has functionality to condense light emitted from the illumination device and reflected off the document M, and form an image on a sensor IC 4.

The sensor IC 4 receives the light condensed by the optical imaging system 3, performs photoelectric conversion on the received light, and outputs an electrical signal. The sensor IC 4 includes a light receiver having a semiconductor chip and the like, a drive circuit, and the like. The sensor IC 4 is an example of the light receiving device.

The frame 5 is set between the board 6 and the optical imaging system 3 is formed of resin or sheet metal. The frame 5 has an effect of blocking light entering the sensor IC 4 from the outside of the image scanning device 100, and also has a dust proofing effect of preventing ingress of dust or the like into the sensor IC 4. The frame 5 is an example of the housing.

The frame 5 is provided with an opening portion 5a extending in the X-axis direction and includes flat surface portions 5b, a pair of inclined portions 5c, and side wall portions 5d. The flat surface portions 5b extend in the X-axis direction. Both inclined portions 5c stand upward towards the document M side from the end portion on the opening portion 5a side of the flat surface portion 5b in the Y-axis direction. The side wall portions 5d stand upward towards the document M side from the respective end portions that are opposite to the opening portion 5a of the flat surface portions 5b in the Y-axis direction. Both inclined portions 5c are inclined such that the gap of the opening portion 5a in the Y-axis direction narrows as the inclined portions 5c approach the side of the document M. That is, the inclined portions 5c have a gap therebetween extending in the X-axis direction. Holder mounts 5e are provided on both ends of the flat surface portion 5b in the X-axis direction and the holder mounts 5e each have a bottom surface coplanar with a bottom surface of the corresponding flat surface portion 5b.

The light guide 2 is arranged such that the flat surface 2e faces the flat surface portion 5b of the frame 5. The light guide 2 is arranged such that the light guide 2 is sandwiched between the inclined portion 5c and the side wall portion 5d. In this arrangement, the reflective surface 2c of the light guide 2 is located on the side wall portion 5d side. Two such light guides 2 are disposed symmetrically relative to a plan passing through the optical imaging system 3.

The rod lenses that constitute the optical imaging system 3 are inserted in the gap of the pair of inclined portions 5c and are retained within the pair of inclined portions 5c by the retaining member 10 such as adhesives or tape.

Figure 5:
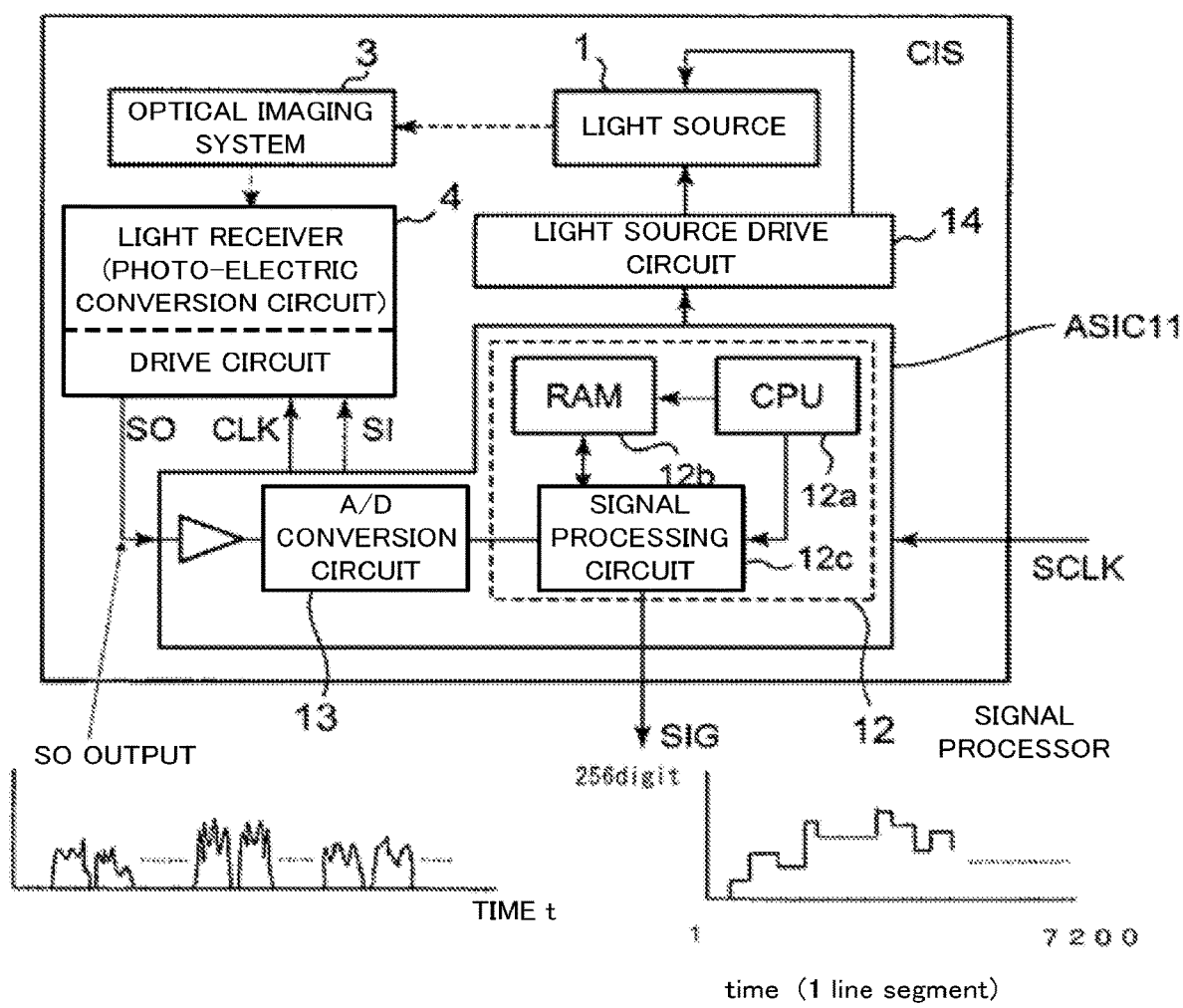
FIG. 5 is a circuit diagram of the image scanning device according to Embodiment 1 of the present disclosure.

In addition to the sensor IC 4, an external connector 18 and other electronic components, such as an application specific integrated circuit (ASIC) 11, are mounted on the board 6. The ASIC 11 is a signal processing IC. As illustrated in FIG. 5, components such as a central processing unit (CPU) 12a, a random access memory (RAM) 12b, and a signal processing circuit 12c of the ASIC 11 operate together, thereby enabling the ASIC 11 to process signals such as outputs obtained by photoelectric conversion by the sensor IC 4 of the received light. The CPU 12a, the RAM 12b, and the signal processing circuit 12c of the ASIC 11 are collectively referred to as a signal processor 12. The board 6 is fixed to the frame 5 using tape, an adhesive, a screw, or the like.

The board 6 is fixed to a surface of the flat surface portion 5b of the frame 5 that is opposite to a surface of the flat surface portion 5b on which the light guide 2 is disposed. In this arrangement, the optical axis of the optical imaging system 3 aligns with the light receiver of the sensor IC 4.

A holder 7 is provided on one end portion of the light guide 2 in the X-axis direction. The end portion of the light guide 2 is inserted into a hole portion 7a of the holder 7. The holder 7 with the light guide 2 inserted therein is fixed to the holder mount 5e of the frame 5 using tape, an adhesive, a screw, or the like. The holder 7 is formed of white resin, for example. In this arrangement, the light guide 2 is disposed such that the flat surface 2e of the light guide 2 on which the light scatterer 2a is provided faces the flat surface portion 5b of the frame 5.

The holder 8 is provided on the other end portion of the light guide 2 in the X-axis direction. That is, the holder 8 is provided at the end portion of the light guide 2 that is opposite to the end portion thereof on which the holder 7 of the light guide 2 is provided. This end portion of the light guide 2 is inserted into the hole portion 8a of the holder 8. The holder 8 with the light guide 2 inserted therein is fixed to the holder mount 5e of the frame 5 using tape, an adhesive, a screw, or the like. The holder 8 is formed of white resin, for example. In this arrangement, the light guide 2 is disposed such that the flat surface 2e of the light guide 2 on which the light scatterer 2a is provided faces the flat surface portion 5b of the frame 5.

The light guide 2 is provided, at a position in the vicinity of the middle of the light guide 2 in the X-axis direction, a projection 2k projecting in the Y-axis direction. This projection 2k is for fixing the light guide 2 to the frame 5 using an adhesive 17. Although both ends of the light guide 2 are positioned by the holder 7 and the holder 8, there is no member to restrain light guide 2 in the vicinity of the middle portion of the light guide 2 in the X-axis direction. Thus, the light guide 2 is fixed at a position as designed by attaching the projection 2k to the frame 5 while measuring the position of the light guide 2. Although a single projection 2k is provided in the current embodiment, multiple projections 2k may be provided.

The external connector 18 is used as an interface for input/output signals including photoelectric conversion outputs of the sensor IC 4 and signal processing outputs of such conversion outputs.

A light source board 9 is a board on which the light source 1 is mounted. The light source board 9 is disposed on the surface of the holder 7 that is opposite to the light guide 2 insertion surface of the holder 7. In this arrangement, the light source 1 is disposed at a position corresponding to a position of the hole portion 7a of the holder 7, and faces the incident surface 2d of the light guide 2. In the current embodiment, the light source 1 is provided at one end of the light guide 2.

An adhesive heat dissipation sheet 16 is provided on the surface of the light source board 9 that is opposite to the light source 1 mounting surface of the light source board 9. The light source board 9 is fixed to the frame 5 by use of the heat dissipation sheet 16. In this case, heat generated when the light source 1 is turned on is conducted via the heat dissipation sheet 16 toward the frame 5 that is metallic, and is then dissipated.

Operations of the image scanning device 100 according to Embodiment 1 of the present disclosure are described. FIG. 5 is a circuit diagram of the image scanning device 100 according to Embodiment 1 of the present disclosure. First of all, the ASIC 11 works together with the CPU 12a to send light source turn-on signals to a light source drive circuit 14. The light source drive circuit 14 supplies power to each light source 1 for a predetermined time based on the received light source turn-on signals. Each light source 1 emits light during the supplying of power. Light emitted by the light source 1 enters the light guide 2 through the incident surface 2d of the light guide 2, propagates while repeatedly undergoing transmission or reflection, and reaches the light scatterer 2a of the light guide 2. Some of light reflected by the light scatterer 2a is emitted from the emission surface 2b of the light guide 2, and is directed toward the document M. The light directed toward the document M is reflected off the document M and condensed by the optical imaging system 3 to form an image on the sensor IC 4.

Figure 6:
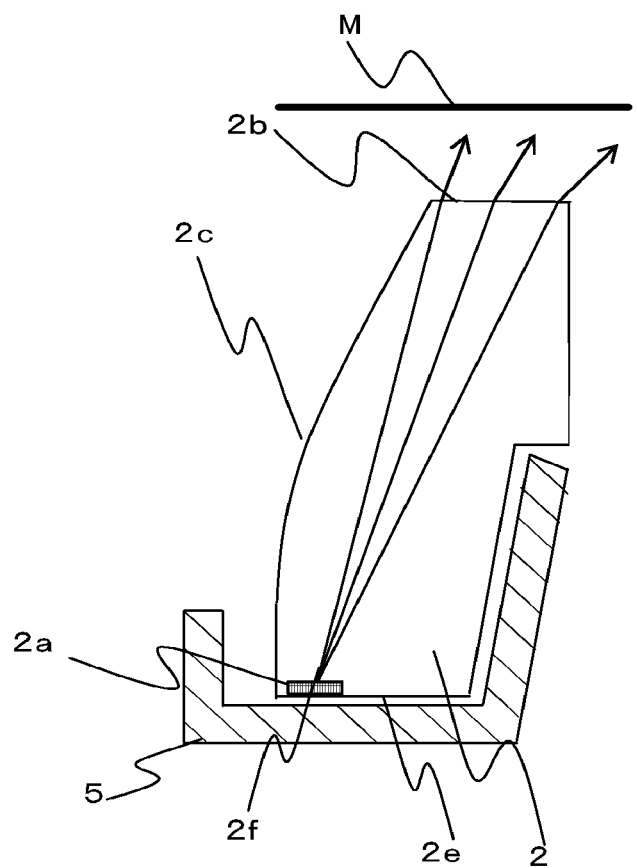
FIG. 6 is a diagram illustrating illumination paths in the image scanning device according to Embodiment 1 of the present disclosure.

The light guide 2 is described in detail. FIG. 6 is a diagram illustrating illumination paths in the image scanning device 100 according to Embodiment 1 of the present disclosure. FIG. 6 is also a cross-sectional view of the light guide 2 on the YZ plane. In FIG. 6, arrows indicate light rays each indicating a direction of light. The light guide 2 includes the light scatterer 2a on the flat surface 2e on the frame 5 side of the light guide 2. The flat surface 2e extends in the X-axis direction, and the light scatterer 2a is also formed in the X-axis direction. The light scatterer 2a has a scattering area having a predetermined length in the Y-axis direction. The light scatterer 2a is formed by a fine concave and convex patterned surface or embossed surface, or by processing such as silkscreen printing. The light scatterer 2a changes the propagation direction of light by reflecting or refracting light propagating in the light guide 2 in the X-axis direction, thereby enabling irradiation of the document M with light. With this arrangement, the light scatterer 2a serves as a second light source. Thus even if color of light or an amount of light emission from the light source 1 changes due to its long-term deterioration, such changes can occur in the X-axis direction entirely in the same manner. Thus, the long-term deterioration of the light source 1, unlike an arrayed light source, does not change brightness or color only in a particular area. There is not only light reflected by the light scatterer 2a but also light transmitted through the light scatterer 2a. For this reason, the flat surface portion 5b of the frame 5 facing the flat surface 2e is preferably formed of a material having a high reflectivity such as white resin or metal. This material allows the light having transmitted through the flat surface 2e including the light scatterer 2a to be returned into the light guide 2, thereby enabling efficient illumination.

The light guide 2 includes the emission surface 2b that is flat in shape, and the emission surface 2b is located on the side of the light guide 2 opposite to the flat surface 2e on which the light scatter 2a is provided. The emission surface 2b extends in the X-axis direction. The light guide 2 includes the reflective surface 2c connecting the emission surface 2b and the flat surface 2e on which the light scatterer 2a is formed together on one side surface. The reflective surface 2c extends in the X-axis direction and has a parabolic shape as viewed from the YZ plane. The light scatterer 2a is formed, in the YZ plane, at a focal point 2f of the reflective surface 2c.

Figure 7:
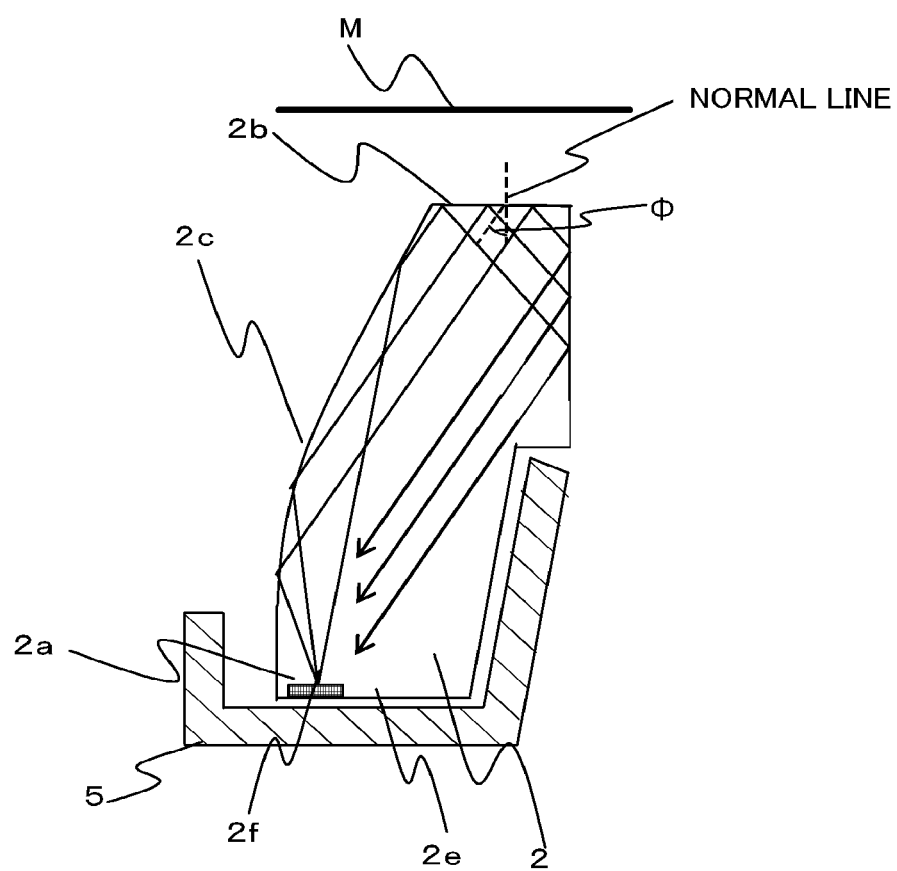
FIG. 7 is a diagram illustrating paths of light reflected off a parabolic surface of the image scanning device according to Embodiment 1 of the present disclosure.

Light entering the light guide 2 through the incident surface 2d propagates through the light guide 2 while being guided by the light guide 2, and then is reflected by the light scatterer 2a. The light reflected by this light scatterer 2a, as illustrated in FIG. 6, is then emitted from the emission surface 2b thereby illuminating the document M. Also, as illustrated in FIG. 7, some light rays are further reflected off the reflective surface 2c and are directed to the emission surface 2b. Since the light scatterer 2a is formed at the position of the focal point 2f of the reflective surface 2c, the light reflected off the reflective surface 2c is directed toward the emission surface 2b as collimated light. The emission surface 2b is a flat surface. A normal direction of the flat surface of the emission surface 2b is set to an angle at which the collimated light reflected off the reflective surface 2c is totally reflected. Thus, by such a configuration, the collimated light directed toward the emission surface 2b is reflected off the emission surface 2b and directed onto the light scatterer 2a again while propagating in the light guide 2. Thus, the light re-entering the light scatterer 2a is scattered and reflected, thereby enabling uniformity in the effect on an illuminance distribution of the light emitting surface of the light source 1. The emission surface 2b is an example of the first emission surface.

Optical characteristics of the end portion on the light source 1 side in the X-axis direction tend to deteriorate because a light amount distribution of the light emitting surface of the light source 1 is transferred as collimated light onto the document M when the light entering the light guide 2 from the light source 1 through the incident surface 2d, directed onto the light scatterer 2a directly, and reflected off the reflective surface 2c reaches the document M. Hereinafter, the light directed onto the light scatterer 2a directly and reflected off the reflective surface 2c is referred to as direct reflection light. The direct reflection light can be blocked by setting an angle of the normal line of the emission surface 2b to an angle at which the direct reflection light is to be totally reflected. The light totally reflected off the emission surface 2b, while propagating through the light guide 2, again is incident upon the light scatterer 2a and is scattered and reflected by the light scatterer 2a. In this scattering and reflection, since the light amount distribution of the light emitting surface of the light source 1 is made uniform, the optical characteristics of the end portion on the light source 1 side in the X-axis direction are stable. Therefore, the angle between the normal line of the emission surface 2b and the collimated light reflected off the reflective surface 2c, that is, the incidence angle (I) at which the collimated light reflected off the reflective surface 2c enters the emission surface 2b is preferably an angle at which the collimated light reflected off the reflective surface 2c is totally reflected. This angle is 40° or more in a case where the light guide 2 is transparent resin.

Light directed from the emission surface 2b of the light guide 2 onto the document M does not include the direct reflection light from the reflective surface 2c that would otherwise cause deterioration of optical characteristics of the end portion. This achieves uniform and stable optical characteristics over the light guide 2 in the main scanning direction. Therefore, the light guide 2, not including an area causing deterioration of the optical characteristics, can be shortened in the X-axis direction (longitudinal direction), and thus an illumination device and an image scanning device that are compact can be attained.

The closer the reflection light of the light from the light scatterer 2a in the reflective surface 2c is to the light scatterer 2a, the less the reflection angle is, and this results in leakage light leaking from the reflective surface 2c to the outside of the light guide 2. In order to suppress this leakage light, the reflective surface 2c may be set to be a mirror surface by performing metal evaporation or the like on the outside of the side surface on which the reflective surface 2c is formed.

Embodiment 2

Figure 9:
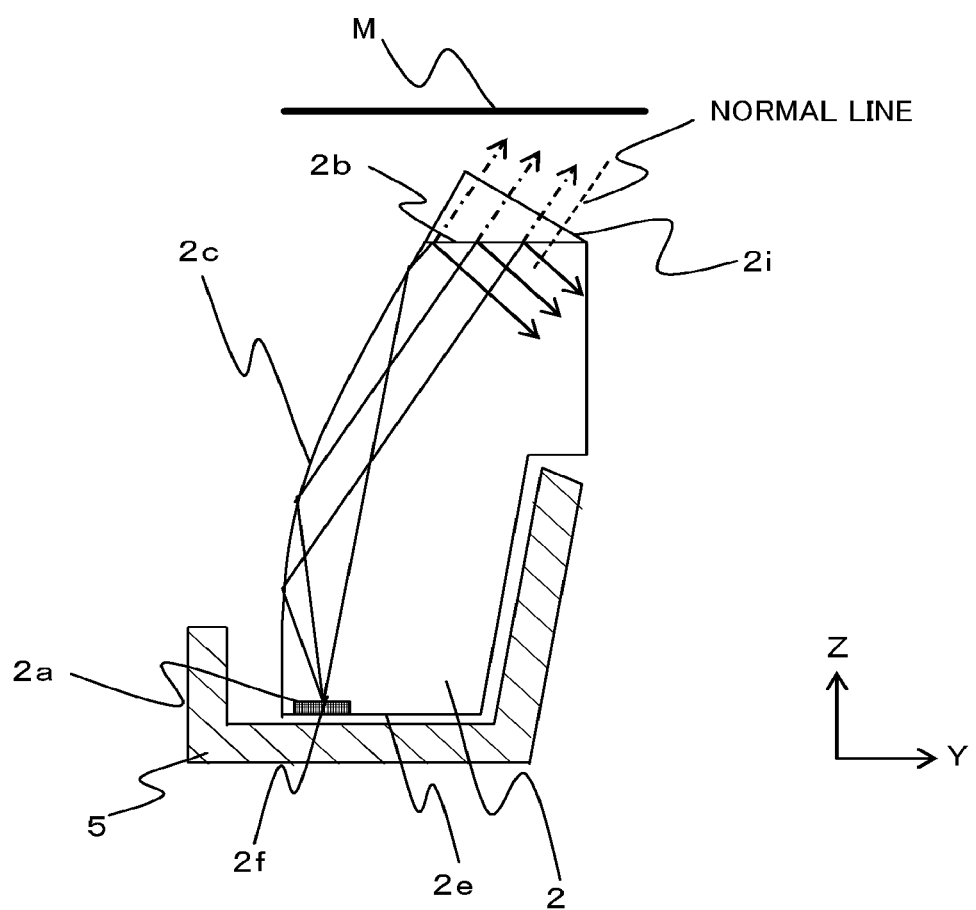
FIG. 9 is a diagram illustrating the illumination paths in an end portion the light source side of the image scanning device according to Embodiment 2 of the present disclosure.
Figure 10:
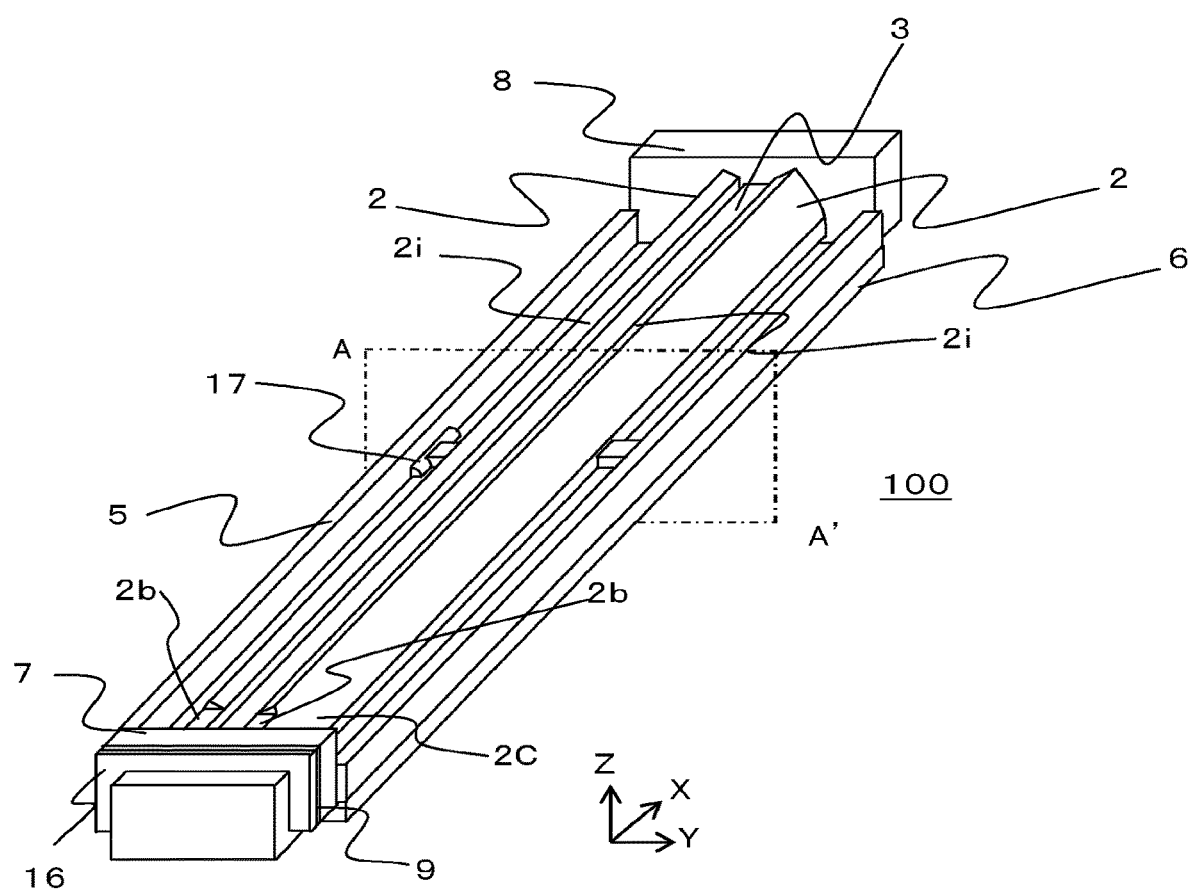
FIG. 10 is a perspective view of the image scanning device according to Embodiment 2 of the present disclosure.
Figure 11:
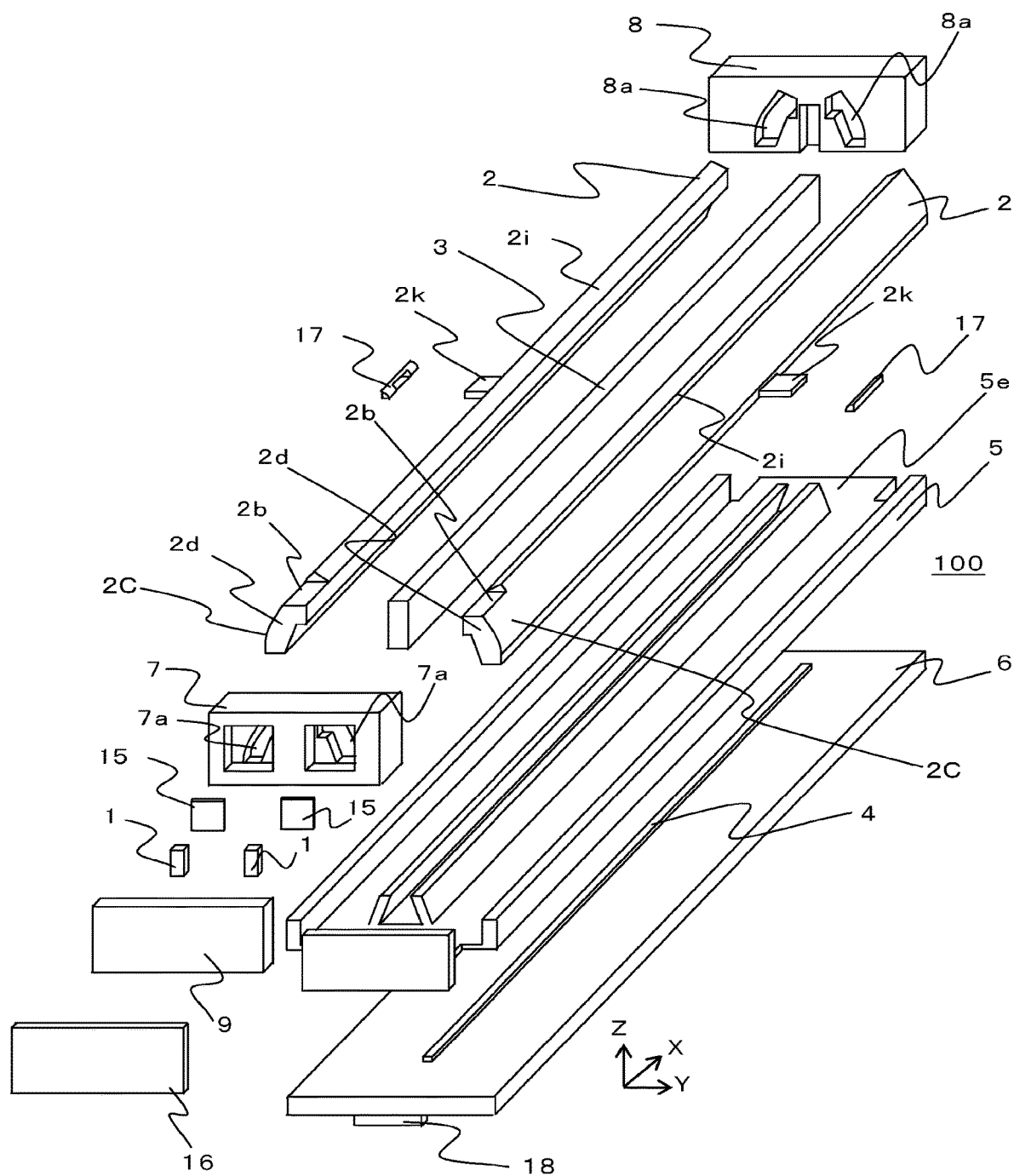
FIG. 11 is an exploded view of the image scanning device according to Embodiment 2 of the present disclosure.

Embodiment 2 of the present disclosure is described with reference to FIG. 8 to FIG. 11. In Embodiment 1, although the emission surface 2b is set to be the same angle along the X-axis direction, the direct reflection light causing deterioration of the optical characteristics at the end portion only occurs on the end portion on the side of the light source 1 in the X-axis direction. Therefore, in Embodiment 2, the emission surface 2b is formed, at an angle at which the collimated light from the reflective surface 2c is totally reflected, only at the end portion on the side of the light source 1 in the X-axis direction, FIG. 10 and FIG. 11 respectively illustrate a perspective view and an exploded view of an image scanning device according to Embodiment 2. In FIG. 10 and FIG. 11, the light guide 2 includes, on the holder 7 side being the side on which the light source 1 is provided, the emission surface 2b at an angle at which collimated light from the reflective surface 2c is totally reflected. Also, on the light guide 2, an emission surface 2i, at an angle at which the collimated light from the reflective surface 2c is emitted, is continuous with the emission surface 2b and extends toward the holder 8 side in the X-axis direction.

Figure 8:
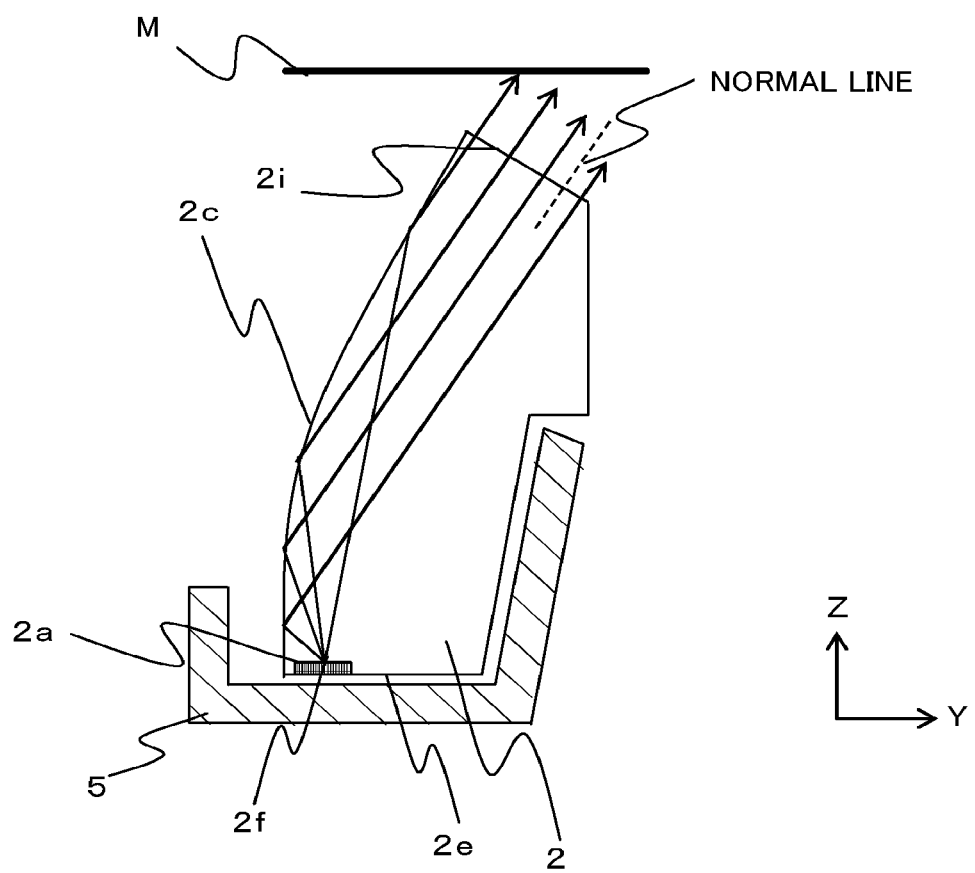
FIG. 8 is a diagram illustrating illumination paths in the vicinity of the middle portion of an image scanning device, in the main scanning direction, according to Embodiment 2 of the present disclosure.

FIG. 8 illustrates a light ray diagram in the vicinity of the middle portion of the light guide 2 in the X-axis direction in Embodiment 2. FIG. 9 illustrates a light ray diagram of an end portion on the light source 1 side of the light guide 2 in the X-axis direction in Embodiment 2. In FIG. 9, the emission surface 2b is formed at an angle at which the reflection light from the reflective surface 2c is totally reflected. In this case as well, the angle between the normal line of the emission surface 2b and the collimated light reflected off the reflective surface 2c, that is, the incidence angle (I) at which the collimated light reflected off the reflective surface 2c enters the emission surface 2b, is set to 40° or more, thereby totally reflecting the collimated light, and preventing irradiation of the document M with the direct reflection light. Also, in FIG. 8, the emission surface 2i is set at an angle at which the reflection light from the reflective surface 2c passes through the emission surface 2i. In the area away from the light source 1, the illuminance distribution of the light emitting surface held by the light source 1 becomes uniform as the light propagates in the light guide 2. Therefore, even though the emission surface 2i, which is provided in the area other than the end portion on the light source 1 side, is set at an angle at which the collimated light reflected off the reflective surface 2c enters through, the light that does not include components that cause the characteristics of the end portion to deteriorate is transmitted through the emission surface 2i thereby illuminating the document M as illustrated in FIG. 8. In a case where the light guide 2 is formed of transparent resin, the collimated light reflected off the reflective surface 2c is transmitted through the emission surface 2i when the collimated light incidents the emission surface 2i at an incidence angle that is less than 40°. As illustrated in FIG. 8, when the emission surface 2i is formed such that the collimated light reflected off reflective surface 2c is parallel with the normal line of the emission surface 2i, meaning that the incidence angle is set to 0°, illumination can be performed in the most efficiently. The emission surface 2i is an example of the second emission surface.

Thus, by setting only the emission surface 2b formed at the end portion on the light source 1 side in the X-axis direction to an angle, at which the direct reflection light that causes deterioration of optical characteristics is totally reflected, the direction reflection light can be blocked. In doing so, uniform optical characteristics in all areas in the X-axis direction can be attained, thereby enabling efficient illumination to be performed.

In FIGS. 10 and 11, although the angle of the emission surface 2b and the angle of the emission surface 2i change at the border between both emission surfaces, an emission surface may be provided between the emission surface 2b and the emission surface 2i to connect both surfaces together in a manner such that the change in angle from the angle of the emission surface 2i to the angle of the emission surface 2b occurs in a stepped manner. This emission surface between the emission surface 2b and the emission surface 2i is an example of the third emission surface.

Embodiment 3

In Embodiment 2, although the emission surface 2b is provided on the end portion of the light source 1 side in the X-axis direction, in Embodiment 3, the emission surface 2b that totally reflects the collimated light from the reflective surface 2c and the emission surface 2i through which the collimated light from the reflective surface 2c transmits are connected in a continuous manner with varying angles.

Although uniform optical characteristics are obtainable along the X-axis direction in the case of Embodiment 2, there might be a difference in the amount of that is emitted from the emission surface 2b that totally reflects the reflection light from the reflective surface 2c and the amount of light that is emitted from the emission surface 2i through which the reflection light of the reflective surface 2c passes. A light amount difference up to a certain degree can be accommodated by the density of the fine concave and convex patterns provided on the light scatterer 2a. However, in an arrangement where the change in the shape from the emission surface 2b to the emission surface 2i is sudden, the fine concave and convex patterns may be unable to sufficiently accommodate for this sudden shape change. In order to address this, in Embodiment 3, an emission surface 2j is provided between the emission surface 2b and the emission surface 2i. This emission surface 2j connecting the emission surface 2b and the emission surface 2i provides continuous angular variation starting from the angle of the emission surface 2b and ending at the angle of the emission surface 2i. This can reduce the sudden changes in the emission light amount resulting from the angular difference between the emission surface 2i and the emission surface 2b.

Figure 12:
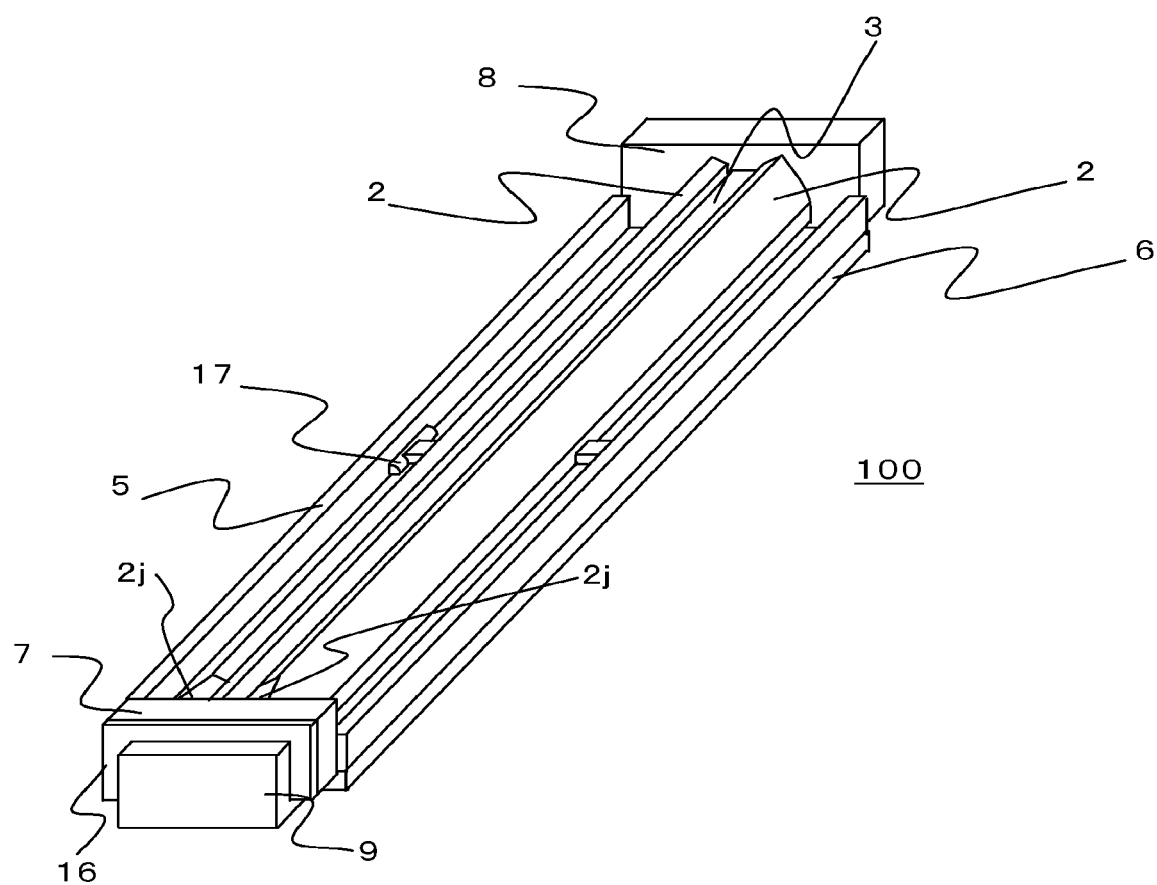
FIG. 12 is a perspective view of an image scanning device according to Embodiment 3 of the present disclosure.
Figure 13:
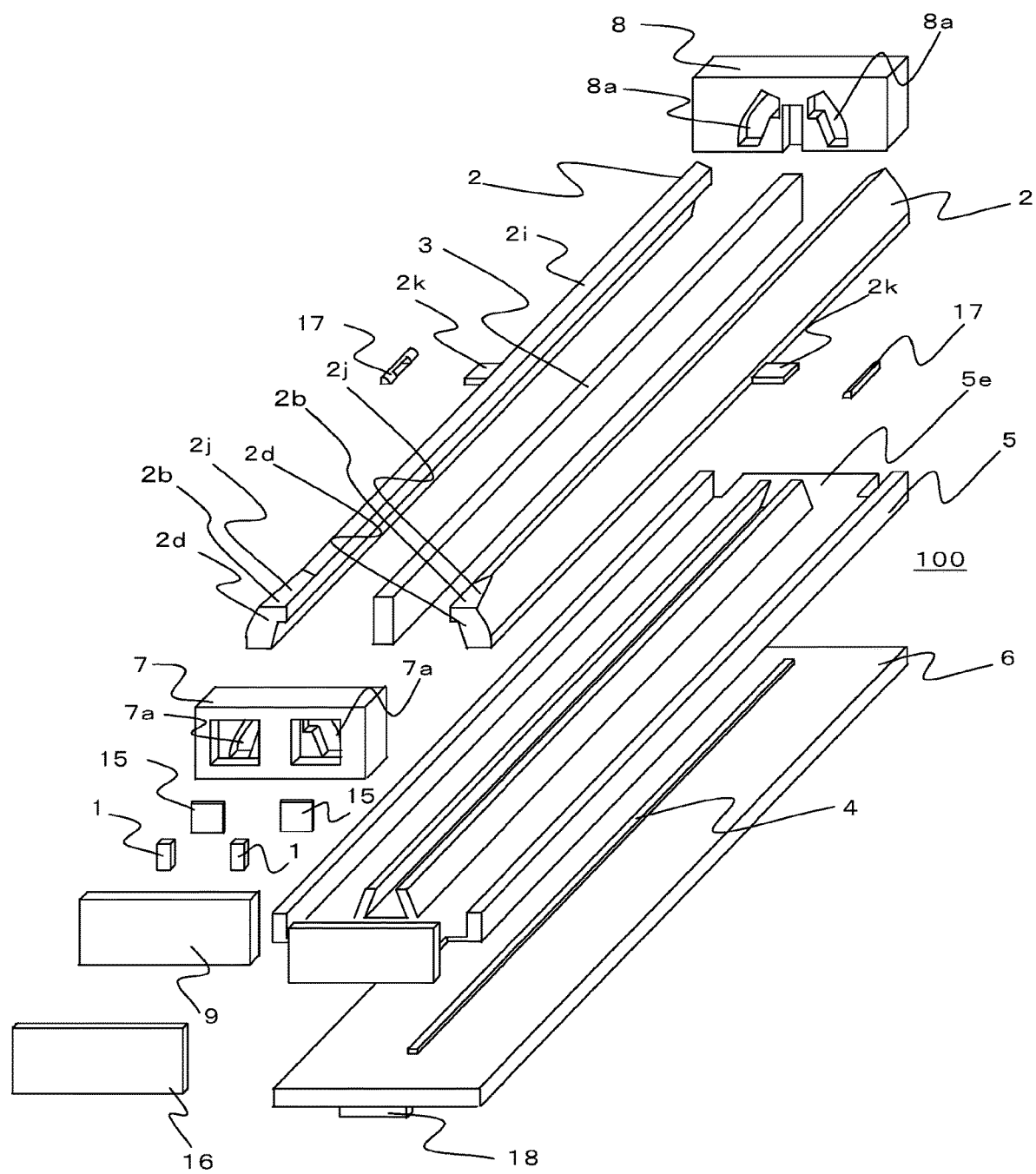
FIG. 13 is an exploded view of the image scanning device according to Embodiment 3 of the present disclosure.

FIG. 12 and FIG. 13 respectively illustrate a perspective view and an exploded view of an image scanning device according to Embodiment 3. Providing the emission surface 2j having continuous angular variation, as illustrated in FIG. 12 and FIG. 13, allows the change in the emission light amount between the emission surface 2i and the emission surface 2b to be smoothened. Therefore, by adjusting the density of the fine concave and convex patterns of the light scatterer 2a, the amount of light emitted from the emission surface 2i can be adjusted, and thus illumination can be provided at a uniform brightness along the main scanning direction. The emission surface 2j is an example of the third emission surface.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2018-117551 filed on Jun. 21, 2018, the entire disclosure of which is incorporated by reference herein.

REFERENCE SIGNS LIST

1 Light source
2 Light guide
2a Light scatterer
2b Emission surface
2c Reflective surface
2d Incident surface
2e Flat surface
2f Focal point
2g Inclined surface
2i Emission surface
2j Emission surface
2k Projection
3 Optical imaging system
4 Sensor IC
5 Frame
5a Opening portion
5b Flat surface portion
5c Inclined portion
5d Side wall portion
5e Holder mount
6 Board
7 Holder
7a Hole portion
8 Holder
8a Hole portion
9 Light source board
10 Retaining member
11 ASIC
12 Signal processor
12a CPU
12b RAM
12c Signal processing circuit
13 A/D conversion circuit
14 Light source drive circuit
15 Infrared cut filter
16 Heat dissipation sheet
17 Adhesive
18 External connector
100 Image scanning device
M Document

The invention claimed is:

1. A light guide that is rod-shaped and extends in a longitudinal direction to guide light entering the light guide to an illumination target, the light guide comprising:
    an incident surface provided at an end portion in a longitudinal direction and upon which light emitted by a light source incidents,
    an emission surface being flat-shaped, the emission surface emitting the light that enters the light guide through the incident surface to the illumination target,
    a reflective surface having a parabolic shape to generate collimated light directed toward the emission surface by reflecting light from a focal point of the parabolic shape or light from a predetermined area including the focal point, and
    a light scatterer having a predetermined scattering area to scatter the light that entered the light guide through the incident surface and reflect light that entered the light guide through the incident surface in a direction of the reflective surface, wherein the emission surface includes a first emission surface that has a predetermined length from the end portion of the light guide facing the light source along the longitudinal direction, the first emission surface being set to an angle at which, among the light scattered by the light scatterer, the collimated light generated by the reflective surface is totally reflected.

2. The light guide according to claim 1, wherein the collimated light incidents upon the first emission surface at an incidence angle at which the collimated light is totally reflected.

3. The light guide according to claim 2, wherein the incidence angle at which the collimated light incidents upon the first emission surface is greater than or equal to 40°.

4. The light guide according to claim 1, wherein the incidence angle at which the collimated light incidents upon the first emission surface is uniform along the first emission surface in the longitudinal direction.

5. The light guide according to claim 1, wherein
the emission surface further includes a second emission surface that extends from the first emission surface along the longitudinal direction, the emission surface emitting the collimated light, and
an incidence angle at which the collimated light incidents upon the second emission surface is (i) less than the incidence angle at which the collimated light incidents upon the first emission surface and (ii) an angle at which the collimated light is emitted.

6. The light guide according to claim 5, wherein
the emission surface further includes a third emission surface between the first emission surface and the second emission surface, the third emission surface extending along the longitudinal direction so as to connect the first emission surface and the second emission surface, and
the third emission surface is provided such that an incidence angle at which the collimated light incidents upon the third emission surface increases, starting from an angle that is equal to the incidence angle at which the collimated light incidents upon the second emission surface, in a stepped manner as the incidence angle approaches a border with the first emission surface and the third emission surface.

7. The light guide according to claim 6, wherein the incidence angle at which the collimated light incidents upon the third emission surface at the border between the first emission surface and the third emission surface is the same as the incidence angle at which the collimated light incidents upon the first emission surface.

8. The light guide according to claim 5, wherein
the emission surface further includes a third emission surface between the first emission surface and the second emission surface, the third emission surface extending along the longitudinal direction so as to connect the first emission surface and the second emission surface, and
the third emission surface is provided such that an incidence angle at which the collimated light incidents upon the third emission surface increases, starting from an angle that is equal to the incidence angle at which the collimated light incidents upon the second emission surface, in a continuous manner as the incidence angle approaches a border with the first emission surface and the third emission surface.

9. The light guide according to claim 8, wherein the incidence angle at which the collimated light incidents upon the third emission surface at the border between the first emission surface and the third emission surface is the same as the incidence angle at which the collimated light incidents upon the first emission surface.

10. The light guide according to claim 5, wherein the incidence angle at which the collimated light incidents upon the first emission surface is greater than or equal to 40°, and the incidence angle at which the collimated light incidents upon the second emission surface is less than 40°.

11. The light guide according to claim 8, wherein the incidence angle at which the collimated light incidents upon the third emission surface increases to 40° from a predetermined angle that is less than 40° as the incidence angle approaches the border between the first emission surface and the third emission surface in the longitudinal direction.

12. The light guide according to claim 6, wherein the incidence angle at which the collimated light incidents upon the third emission surface increases to 40° from a predetermined angle that is less than 40° as the incidence angle approaches the border between the first emission surface and the third emission surface in the longitudinal direction.

13. An image scanning device comprising:
the light guide according to claim 1;
the light source, which is disposed on an end portion of the light guide in the longitudinal direction;
a light receiving device to convert received light into an electrical signal;
an optical imaging system to condense light emitted from the light guide and reflected off the illumination target, and form an image on the light receiving device; and
a housing retaining or housing the light guide, the light source, the light receiving device, and the optical imaging system.

* * * * *